V. O. ZAHNISER.
BAND WHEEL.
APPLICATION FILED JULY 13, 1914.
1,143,013.
Patented June 15, 1915.
2 SHEETS—SHEET 2.
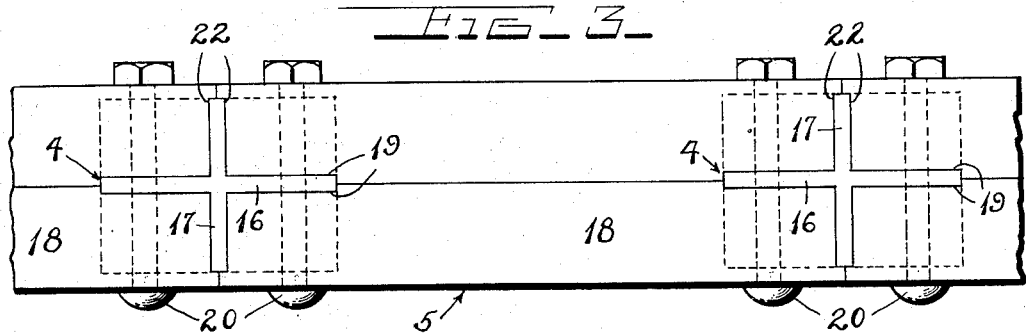
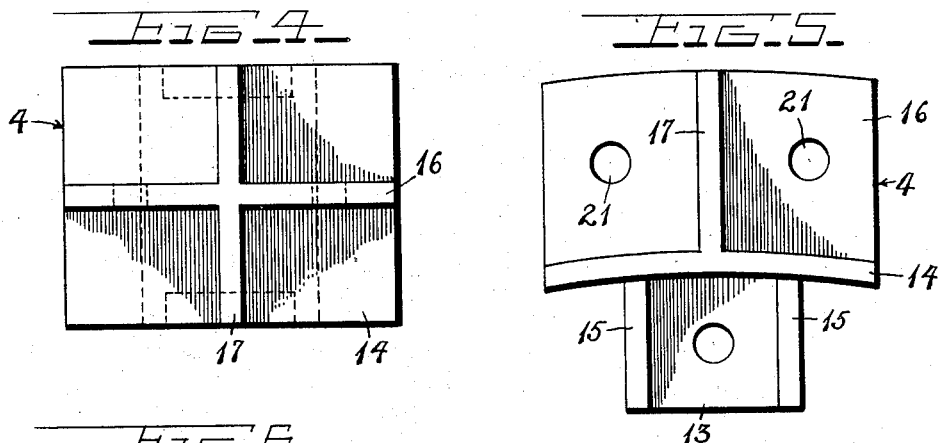
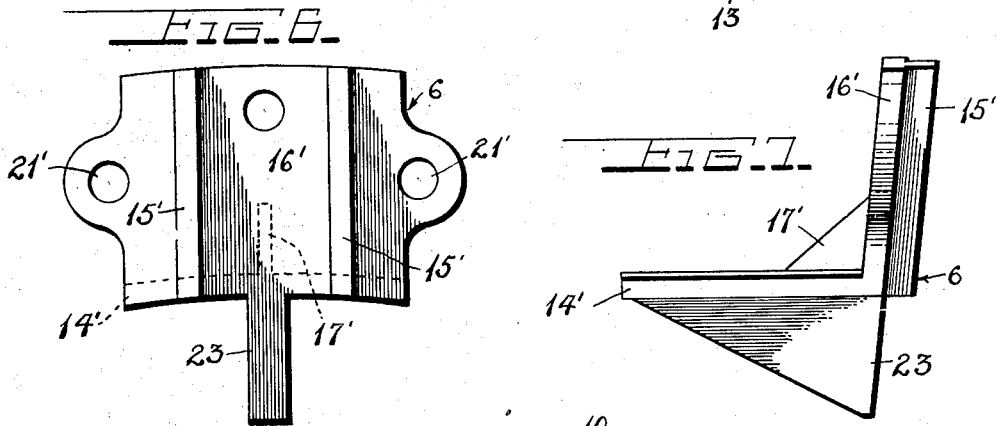
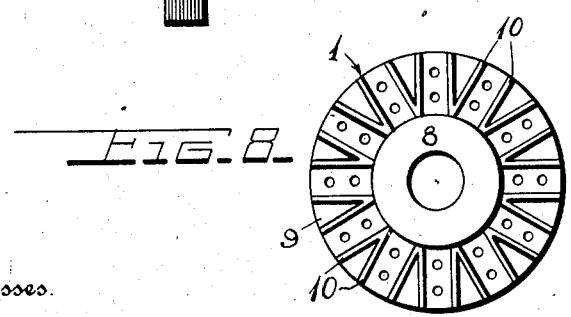
Witnesses.
Edwin O. Hunt.
Inventor
V. O. Zahniser.
By H. B. Willson & Co
Attorneys

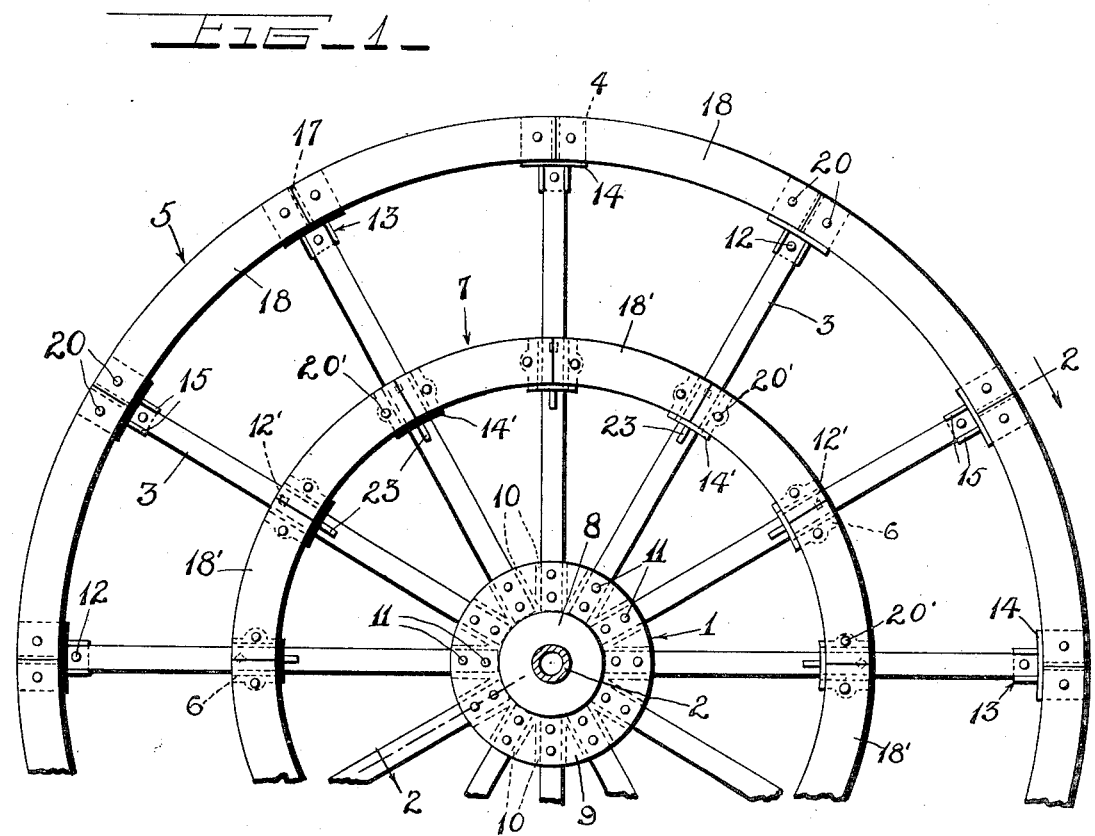

UNITED STATES PATENT OFFICE.

VALENTINE O. ZAHNISER, OF WASHINGTON, PENNSYLVANIA.

BAND-WHEEL.

1,143,013.  Specification of Letters Patent.  Patented June 15, 1915.

Application filed July 13, 1914.  Serial No. 850,797.

*To all whom it may concern:*

Be it known that I, VALENTINE O. ZAHNISER, a citizen of the United States, residing at Washington, in the county of Washington and State of Pennsylvania, have invented certain new and useful Improvements in Band-Wheels; and I do declare the following to be a full, clear, and exact description of the invention, such as will enable others skilled in the art to which it appertains to make and use the same.

My invention relates broadly to improvements in band wheels and more particularly to those of the type commonly employed in connection with well drilling machinery.

The object of the invention is to provide a wheel of the herein set forth type which may be simply and inexpensively manufactured yet one which will be extremely rigid and effective in operation.

In carrying out the above end, the invention aims to provide a number of attaching elements whereby the arcuate rim sections of a band wheel may be removably secured in position.

With the above and other objects in view, the invention resides in certain novel features of construction and combination herein described and claimed and shown in the drawings wherein—

Figure 1 is a side elevation of a portion of a band wheel constructed in accordance with my invention; Fig. 2 is a substantially horizontal section taken on the line 2—2 of Fig. 1; Fig. 3 is a detail plan view of a portion of the wheel; Figs. 4 and 5 are respectively plan and side views of one form of attaching element; Figs. 6 and 7 are respectively an inner side and an edge view of another form of attaching member; and Fig. 8 is an inner side view of one of the hub members.

In the accompanying drawings, I have shown my improved wheel as comprising a pair of hub members 1 which are here shown as rigidly mounted and spaced upon a shaft 2, a number of spokes 3 radiating from said hub members, a number of rim attaching members 4 secured to the outer ends of said spokes and designed for the attachment of the rim 5, and a number of similar attaching members 6 secured to the sides of the spokes and designed for the attachment of a rim 7.

The hub members 1 each comprise a ring shaped body portion 8 upon whose periphery a flange 9 is formed, a number of pairs of parallel ribs 10 being formed on either of the inner or outer sides of the flanges 8 and being designed to receive the spokes 3 which may be of channeled or angle iron or may be in the form of flat metal bars as shown in the drawings, suitable bolts or rivets 11 being passed through the inner ends of the spokes and through the flanges 9 for the purpose of rigidly securing the former to the latter. By an inspection of Fig. 2, it will be seen that the pairs of spokes 3 converge from their inner toward their outer ends.

The extreme free ends of the spokes 3 are secured by means of bolts or other suitable fasteners 12 to pairs of lugs 13 which extend radially inward from a number of arcuate attaching plates 14, said lugs and plates constituting portions of the members 4. It will be noted that each plate 14 is here shown as of rectangular formation and as being provided with a pair of inwardly extending lugs 13 which are provided on their outer edges with radial ribs 15 which embrace the spokes 3 as clearly set forth in the drawings. It will be further noted that each plate 14 is provided, upon its periphery, with a longitudinally extending flange 16 which extends throughout its length and with a transverse flange 17 which extends throughout its width and intersects the flange 16 at substantially its center.

With the spokes and the members 4 in the above set forth positions, a number of arcuate rim sections 18 are secured to said members 4, the opposite ends of said sections 18 contacting with the transverse flanges 17 while their inner curved surfaces rest against the periphery of the plates 14, their inner end portions, lying parallel to their outer edges, being notched as indicated at 19 and bearing against the flange 16, suitable fasteners 20, here shown in the form of bolts, being passed through the end portions of said rim sections 18 and through openings 21 formed in the flanges 16 whereby to rigidly secure said rim sections in position upon said plates. If the sections 18 be of greater width than the width of the portion of the plate 14 upon which they bear, as illustrated in the present case, the ends of said sections may be notched as at 22 for the reception of the transverse flanges 17.

By the above set forth construction, an extremely rigid and efficient wheel is provided upon whose periphery a driving belt (not shown) is adapted to travel for the purpose of rotating a tug wheel to be described.

Secured adjacent the intermediate portions of the spokes 3, is a second series of arcuate attaching plates 14' whose peripheries are provided, on one edge, with rectangular flanges 16' which correspond to the flanges 16 while transverse flanges 17' are also provided, the last mentioned flanges being integrally united at one end with the longitudinal flanges 16' and being also united integrally or otherwise with the peripheries of the arcuate plates 14'. In this case, it will be noted that the flanges 17' are of less size than the flanges 17 and that their upper edges incline downwardly and outwardly as clearly seen in Figs. 2 and 7. The parts just described as well as parts now to be described constitute portions of the attaching members 6 hereinbefore mentioned.

For the purpose of rigidly securing the plates 14' in fixed relation to the spokes 3, the flanges 16' are provided with radial ribs 15' which straddle said spokes 3, suitable bolts or other fasteners 12' being passed through said spokes and through the outer edge portions of the plates 16'. When the parts are thus assembled, a number of arcuate rim sections 18' constituting the rim 7, are secured in position with their inner curved surfaces contacting with the peripheries of the plates 14' while their ends are notched as indicated at 22' in Fig. 2, for the reception of the flanges 17', suitable transverse bolts 20' being passed through the rim sections 7 and through apertured ears 21' which are formed on the radial edges of the plates 16', whereby said sections 18' are forced into binding frictional contact with the flanges 16'. If desired, a number of inclined bracing ribs 23 may be employed on the inner curved surfaces of the plates 14', said ribs contacting with the spokes as clearly seen in Fig. 2.

The construction just described constitutes the tug wheel above mentioned and whose periphery is preferably grooved as indicated at 24 in order to receive a cable (not shown) which is commonly employed with devices of this character for the purpose of driving the bull wheel (not shown).

From the foregoing description, taken in connection with the accompanying drawings it will be seen that although from a casual inspection, the construction of the attaching members 4 and 6 seems to be vastly different, each of said members comprises an arcuate plate, a longitudinal flange formed on the periphery thereof and a transverse flange abutting said longitudinal flange and united thereto and to the periphery of said plate.

Having thus described my invention, what I claim as new and desire to secure by Letters-Patent is:

1. The combination with a hub and a plurality of spokes radiating therefrom, of a plurality of arcuate plates secured to said spokes and each having a longitudinally extending flange formed integrally with its periphery and a transverse flange likewise formed integrally with said periphery and with said longitudinal flange, a plurality of arcuate rim sections having their inner curved surfaces in contact with the peripheries of said plates, the end portions of said sections abutting said transverse and longitudinal flanges, and means for securing said sections in position.

2. The combination with a hub and a plurality of spokes radiating therefrom, of a plurality of circumferentially spaced arcuate plates each having an attaching lug extending radially inward from its inner curved surface, fasteners passing through the free ends of said spokes and through said lugs, the plates also having longitudinal flanges formed integrally with their peripheries at substantially their central portions, and transverse flanges likewise formed integrally with their peripheries and with the longitudinal flanges at substantially their central portions, a plurality of arcuate rim sections contacting on their inner curved surfaces with said arcuate plates, said sections having their ends and their inner side portions contacting respectively with said transverse and longitudinal flanges, and fastening means for securing said rim sections in position.

3. In a device of the character described, a plurality of spaced arcuate plates each having a longitudinal and a transverse flange formed integrally with its periphery, said flanges intersecting each other at the center of the plate, a number of arcuate rim sections having their end portions contacting with said flanges and said plates, means for securing said sections in position, each of the plates also having a pair of lugs projecting radially inward from their inner curved surfaces, the lugs having radial ribs on their opposite edges, spokes interposed between said ribs and contacting with the lugs, fasteners passing through the latter and through the spokes, and a hub from which said spokes radiate.

4. The combination with a hub and a number of spokes radiating therefrom, of two series of arcuate plates secured to said spokes, one series being secured to the outer ends of the latter and the other series being secured to the intermediate portions thereof, the plates of both series having longitudinal flanges and transverse flanges formed integrally with their peripheries, said flanges being also integrally united with each other at substantially their central portions, a number of arcuate rim sections having their opposite end portions contacting with the plates of the outer series and with the flanges thereof, other arcuate rim sections contacting with the plates of the other series and with the flanges thereof, and independent means for securing the two sets of arcuate rim sections in effective position.

5. A wheel of the class described comprising a hub, a plurality of spokes radiating therefrom, a plurality of rectangular arcuate plates, each having a pair of lugs formed integrally with its inner curved surface, said lugs having parallel ribs formed integrally with their opposite edges, the outer ends of the spokes being located between said ribs and in contact with said lugs, bolts passing through said lugs and through said spokes, the arcuate plates also having longitudinal outwardly extending flanges and rectangular transverse outwardly extending flanges formed integrally with their peripheries and likewise formed integrally with each other, each plate having one longitudinal flange and one transverse flange whereby to provide each of said plates with four angular seats, arcuate rim sections whose opposite ends rest within said seats, and bolts passing through said ends of the rim sections and through said longitudinal flanges.

In testimony whereof I have hereunto set my hand in presence of two subscribing witnesses.

VALENTINE O. ZAHNISER.

Witnesses:
    BEATRICE CARROLL,
    J. L. BOOKER.